United States Patent
Matsuda et al.

(10) Patent No.: US 7,537,035 B2
(45) Date of Patent: May 26, 2009

(54) PNEUMATIC TIRE WITH WOUND CORD LAYER BETWEEN CARCASS LAYER AND BELT LAYERS

(75) Inventors: Jun Matsuda, Hiratsuka (JP); Yoshiaki Hashimura, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 211 days.

(21) Appl. No.: 11/653,134

(22) Filed: Jan. 11, 2007

(65) Prior Publication Data

US 2007/0169871 A1     Jul. 26, 2007

(30) Foreign Application Priority Data

Jan. 20, 2006     (JP) ............................. 2006-012590

(51) Int. Cl.
    *B60C 9/22*          (2006.01)
    *B60C 13/00*     (2006.01)

(52) U.S. Cl. ........................ 152/531; 152/533; 152/538; 156/87

(58) Field of Classification Search ................. 152/531, 152/533, 538; 156/87
See application file for complete search history.

(56) References Cited

FOREIGN PATENT DOCUMENTS

| JP | 03-213408 | | 9/1991 |
|---|---|---|---|
| JP | 04085105 A | * | 3/1992 |
| JP | 08216618 A | * | 8/1996 |
| JP | 2003-080905 | | 3/2003 |
| JP | 2004-359073 | | 12/2004 |
| WO | WO 2007/083440 | | 7/2007 |

* cited by examiner

*Primary Examiner*—Adrienne C Johnstone
(74) *Attorney, Agent, or Firm*—Greer, Burns & Crain, Ltd.

(57) ABSTRACT

A pneumatic tire is provided which enables durability thereof to be improved by preventing oxidation degradation of belt layers. In the pneumatic tire, a carcass layer is laid between a pair of bead portions so that the carcass layer links the bead portions, an air penetration preventing layer is disposed on the inner surface of the tire along the carcass layer, and belt layers are buried in a tread portion at the side of the outer periphery of the carcass layer. In the pneumatic tire, a cord layer, which is formed by repeatedly winding a cord in the tire circumferential direction, is disposed between the carcass layer and the belt layers, and at least one portion of the cord layer is made close to the outer surface of the tire so that a distance between the cord and the outer surface of the tire is not longer than 2 mm.

2 Claims, 2 Drawing Sheets

PNEUMATIC TIRE WITH WOUND CORD LAYER BETWEEN CARCASS LAYER AND BELT LAYERS

BACKGROUND OF THE INVENTION

1. Field of the Invention

The present invention relates to a pneumatic tire in which belt layers are buried in a tread portion, and more particularly to a pneumatic tire which enables durability thereof to be improved by preventing oxidation degradation of the belt layers.

2. Background Art

Separation between a cord and coating rubber at ends of the belt layers in the axial direction of the tire can be cited as one example of a cause of decrease in durability of a pneumatic tire in which the belt layers are buried in a tread portion. Particularly, the deterioration of the belt layers tends to cause the separation between a cord and coating rubber. It has been pointed out that, because oxygen in the air oxidizes coating rubber of belt layers, such deterioration of belt layers is accelerated in a process, in which air in a tire leaks from the tire.

From this viewpoint, inhibiting of oxidation degradation of coating rubber of belt layers in the following manner has been proposed. A cord reinforcement layer is buried in a buttress portion of a pneumatic tire. The cord reinforcement layer is formed by arranging a plurality of cords in the axial direction of the tire. The cord reinforcement layer consists of a belt inner portion extending in a region below the belt layers, an extending portion extending outward in the axial direction of the tire, and a close portion close to the outer surface of the tire. Thus, air moving in the tire is lead to the outside of the tire through a cord reinforcement layer and thereby a large amount of oxygen can be prevented from passing near the ends of the belt layers. Hence, the oxidation degradation can be inhibited (refer to, for instance, Japanese patent application Kokai publication No. 2003-80905).

However, the following problem is brought about in the case where a cord reinforcement layer, which is formed by arranging a plurality of cords in the axial direction of a tire, is buried in a buttress portion of the tire, and where an end of the cord reinforcement layer is made close to the outer surface of the tire. Specifically, the problem is that moisture is supplied to belt layers through the cord reinforcement layer in the case where the end of the cord reinforcement layer is made close to the outer surface of the tire. This is because the buttress portion relatively often touches water when the tire is driven on a wet road surface. Accordingly, the moisture accelerates the deterioration of the belt cord, and this causes decrease in durability of the pneumatic tire. In addition, the buttress portion is deformed to a large extent when the tire is driven. For this reason, the cord reinforcement layer tends to be damaged from the end thereof when the end is made closer to the outer surface of the tire near the buttress portion. This also causes the decrease in durability of the pneumatic tire. To sum up, it is not possible to sufficiently obtain effects of improving durability of a pneumatic tire even if oxidation degradation of belt layers is prevented based on the cord reinforcement layer.

SUMMARY OF THE INVENTION

An object of the present invention is to provide a pneumatic tire which enables durability thereof to be improved by preventing oxidation degradation of belt layers.

The pneumatic tire of the present invention for the purpose of achieving the above object includes a carcass layer which is laid between a pair of bead portions so that the carcass layer links the bead portions, an air penetration preventing layer which is disposed on the inner surface of the tire along the carcass layer, and belt layers which are buried on the outer periphery of the carcass layer in a tread portion. The pneumatic tire is characterized in that a cord layer, which is formed by repeatedly winding a cord in the tire circumferential direction, is disposed between the carcass layer and the belt layers, and in that at least a portion of the cord layer is made close to the outer surface of the tire so that the distance between the cord and the outer surface of the tire is not longer than 2 mm.

In the present invention, the cord layer is disposed between the air penetration preventing layer and the belt layers, and at least one portion of the cord layer is made close to the outer surface of the tire. Accordingly, air moving toward the belt layers in the tire is taken into the cord of the cord layer in the process in which the air gradually oozes out to the outside of the tire, so that the air can be discharged to the outside of the tire from the portion of the cord layer, which is made close to the outer surface of the tire. Hence, the amount of oxygen passing through the belt layers can be reduced so that the oxidation degradation of the belt layers can be inhibited, and thereby it is possible to improve durability of the pneumatic tire.

In addition, the cord layer itself is prevented from causing decrease in durability of the tire since the cord layer has the configuration in which the cord is repeatedly wound in the tire circumferential direction. In other words, in the case where a cord layer has the configuration in which a cord is repeatedly wound in the tire circumferential direction, an effect of discharging oxygen is secured and supply of moisture to the belt layers can be avoided although the moisture permeates through the cord layer, which is close to the outer surface of the tire near a road surface, when the tire is driven on the wet road surface. The supply of the moisture can be prevented because a path becomes longer in which the moisture reaches the belt layers through the cord of the cord layer. In the case where a cord layer has the structure in which a cord is repeatedly wound in the tire circumferential direction, since almost no cord terminal exists, the cord layer is prone to occur damage from a portion of the cord layer close to the outer surface of the tire, even though the cord layer is made close to the outer surface of the tire. Hence, it is possible to receive the utmost effect of improving the durability of the tire because of the cord layer. Note that the cord layer does not cause decrease in capability of keeping an internal pressure of the pneumatic tire. This is because the cord layer leads air passing through the air penetration preventing layer to the outside of the tire, and because the capability of keeping the internal pressure of the pneumatic tire is secured based on the air penetration preventing layer.

In the present invention, at least one portion of the cord layer is preferably made close to the outer surface of the tire so that the distance between the cord and the outer surface of the tire is not longer than 2 mm in at least half of the entire periphery of the tire. This configuration makes it is possible to sufficiently secure an effect of discharging the air moving toward the belt layers to the outside of the tire.

In addition, it is desirable that the width, in which the cord layer and the belt layers overlap each other in the axial direction of the tire, should be not less than 10 mm. This width makes it possible to securely protect portions around the ends of the belt layers susceptible to separation damage. Note that an end of the cord layer preferably do not exist in a region under the belt layers since the end cause the damage in some cases where the end of the cord layer is disposed in the region under the belt layers.

DETAILED DESCRIPTIONS OF THE PREFERRED EMBODIMENTS

Detailed descriptions will be provided below for a configuration of the present invention by referring to the attached drawings.

Figure 1:
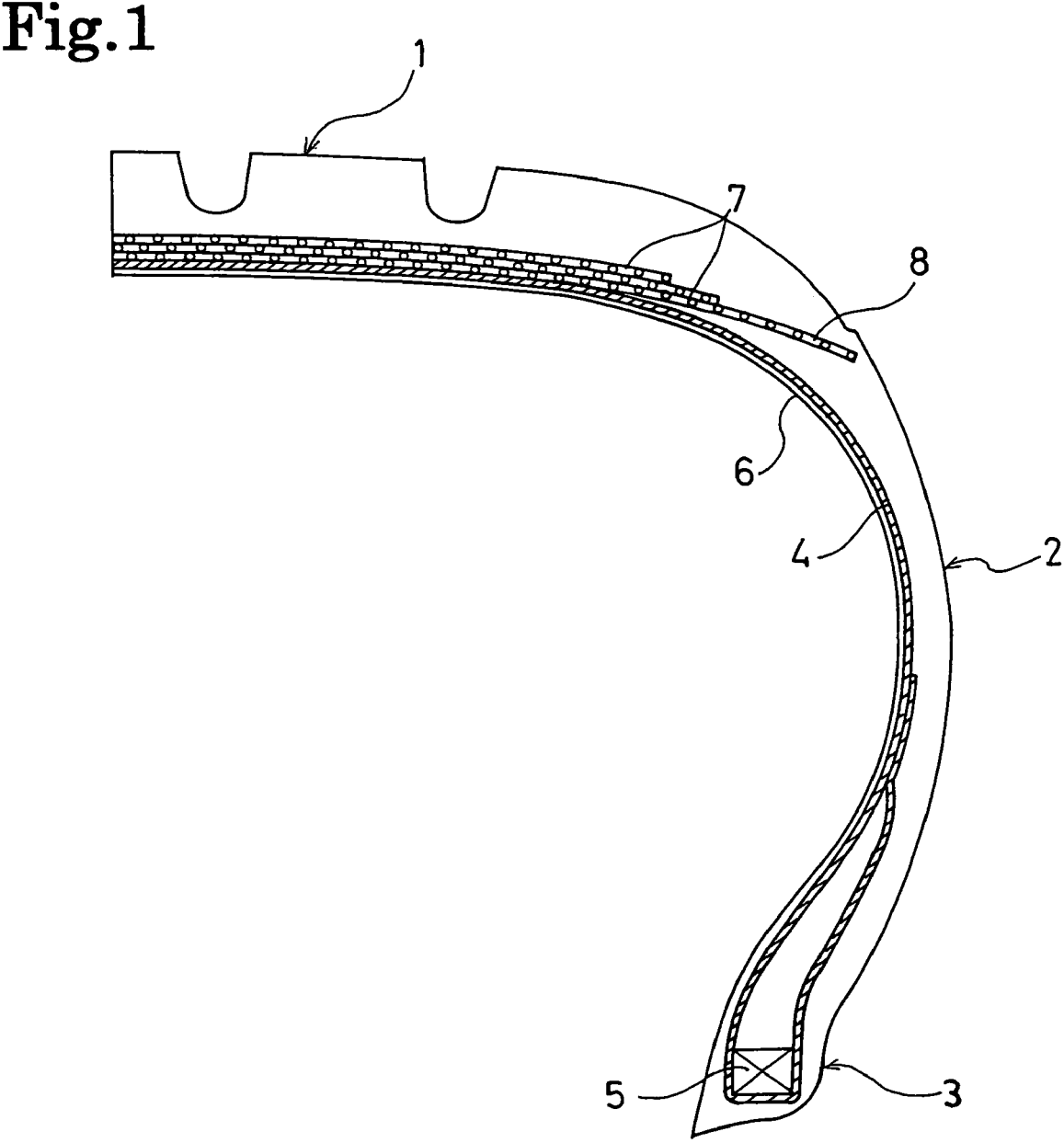
FIG. 1 is a meridian cross-sectional view illustrating a pneumatic tire configured from a first embodiment of the present invention.

FIG. 1 illustrates a pneumatic tire configured from an embodiment of the present invention. In FIG. 1, reference numeral 1 denotes a tread portion; 2, side-wall portions; and 3, bead portions. A carcass layer 4 is laid between the pair of left and right bead portions 3, 3, so that the carcass layer 4 links the bead portions. The two ends of the carcass layer 4 are bent outward from the inside of the tire so that the bent ends surround respectively bead cores 5. An air penetration preventing layer 6 (inner liner layer) is disposed on the inner surface of the tire along the carcass layer 4. The air penetration preventing layer 6 may be configured of a rubber component mainly composed of butyl rubber, or configured of a composite resin material obtained by dispersing elastomer into thermoplastic resin or thermoplastic resin. On the outer periphery of the carcass layer 4, on the other hand, a plurality of belt layers 7 are disposed so that the belt layers 7 cover the whole outer periphery of the tire. The belt layers 7 include reinforcing cords inclining relative to the circumferential direction of the tire, and are disposed so that the reinforcing cords of the disposed belt layers 7 intersect each other between the layers.

Figure 2:
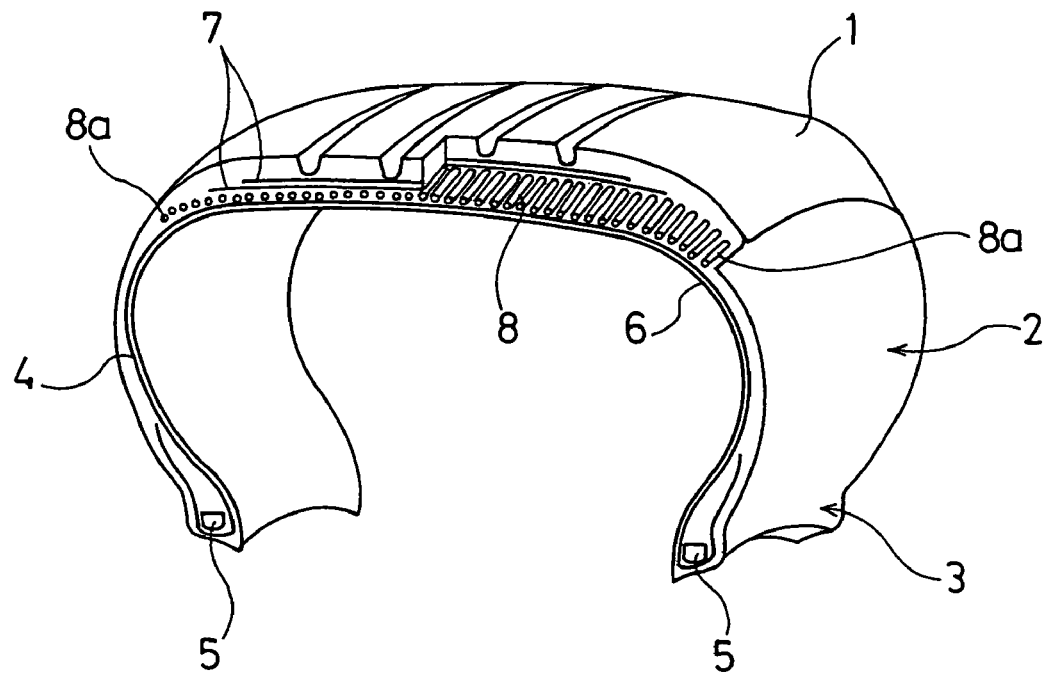
FIG. 2 is a perspective cross-sectional view illustrating the pneumatic tire of FIG. 1.
Figure 3:
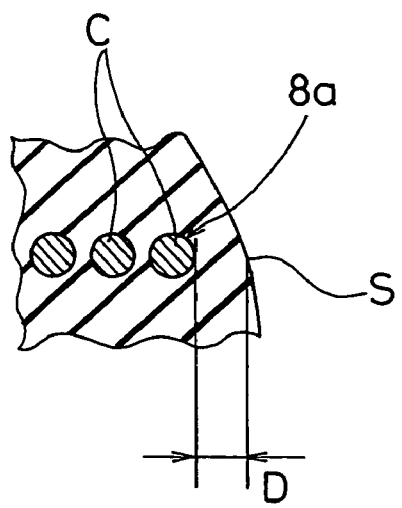
FIG. 3 is a cross sectional view illustrating an essential part of the pneumatic tire of FIG. 1.

In the pneumatic tire, a cord layer 8 is disposed between the carcass layer 4 and the belt layers 7. The cord layer 8 is configured by winding one cord or a plurality of cords in the tire circumferential direction so that an angle of the cord or each of the cords to the tire circumferential direction can be not greater than 10 degrees (refer to FIG. 2). As the cord of the cord layer 8, an organic fiber cord such as nylon, polyester, polyethylene terephthalate, or aramid is preferably used. At least a part of the cord layer 8 is close to the outer surface of the tire as illustrated in a magnified view of FIG. 3 so that a distance D between the cord C and the outer surface S of the tire is not longer than 2 mm. In the embodiment, the cord layer 8 extends in the tire width direction and two ends 8a of the cord layer 8 in the tire width direction are close to the outer surface of the tire.

In the pneumatic tire, the cord layer 8 is disposed between the air penetration preventing layer 6 and the belt layers 7, and at least one portion of the cord layer 8 is made close to the outer surface of the tire. For this reason, air moving toward the belt layers 7 in the tire is taken to the cord of the cord layer 8 so that the air can be discharged to the outside of the tire from the part of the cord layer 8, which is made close to the outer surface of the tire. The air is discharged in a process where the air is gradually discharged to the outside of the tire due to the difference between pressures of the inside and outside of the tire. Accordingly, the amount of oxygen passing through the belt layers 7 is reduced to inhibit the oxidation degradation of coating rubber of the belt layers 7, and thereby it is made possible to improve the durability of the pneumatic tire.

Furthermore, it is possible to prevent decrease in the durability of the tire due to the cord layer 8, since the cord layer 8 has the structure in which a cord is repeatedly wound in the tire circumferential direction. Specifically, in the case where the cord layer 8 has the structure in which a cord is repeatedly wound in the tire circumferential direction, moisture can be prevented from being supplied to the belt layers 7. This is because the path is made longer, in which the moisture permeating through the cord layer 8 when the tire is driven on a wet road surface reaches the belt layers 7 through the cord of the cord layer 8. In addition, it is possible to prevent occurrence of damage such as side blow occurring from the close portion of the cord layer 8 due to the deformation of the tire when the tire is driven, since almost no cord terminal exists in the cord layer 8.

In the portion of the cord layer, which is made close to the outer surface of the tire, the distance D between the cord and the outer surface of the tire is set to not longer than 2 mm. When the distance D of the cord layer 8 is longer than 2 mm, it is difficult to discharge, to the outside of the tire, the air lead to the inside of the cord. The cord of the cord layer 8 may be exposed to the outside of the outer surface of the tire. In this case, the distance D is 0 mm.

The ends 8a of the cord layer 8 are preferably made close to the outer surface of the tire so that the distance D between the cord and the outer surface of the tire is not longer than 2 mm in the half periphery or more of the tire. It goes without saying that the ends 8a of the cord layer 8 may be made close to the outer surface of the tire in the whole periphery of the tire. Because of the distance, the air moving toward the belt layers 7 can be effectively discharged to the outside of the tire.

In the above-described embodiment, the cord layer 8 extends along the belt layers 7, and has the ends not respectively in areas under the belt layers 7. The configuration, in which the ends of the cord layer 8 are excluded respectively from the areas under the belt layers 7, is excellent from the viewpoint of the durability. However, the cord layer 8 may be ones overlapping the ends of each of the belt layers 7, and such cord layers 8 may be disposed respectively in the ends of each of the belt layers 7. In this case, the following is desirable: a width, in which the cord layer 8 and the belt layers 7 overlap in the axial direction of the tire, from one of the ends of the belt layers 7 is at least 10 mm. This width makes it possible to securely protect the ends of the belt layers 7, which are susceptible to the separation damage.

The preferable embodiment of the present invention has been described in detail so far. However, it should be understood that various kinds of change, substitution and replacement can be made for the embodiment unless the change, substitution and replacement depart from the spirit and scope of the invention defined by the attached claims.

EXAMPLE

Pneumatic tires of a conventional example, a comparative example and an example were prepared. Each of the tires had a tire size of 195/65R15, and the tires respectively had structures different from one another.

In the tire of the conventional example, belt layers were buried in a tread portion at the side of the outer periphery of a carcass layer, and an air penetration preventing layer is provided to the inner surface of the tire. The tire of the comparative example had the structure same as that of the conventional example except the following point. Cord layers were disposed between the carcass layer and the belt layers in buttress portions, the cord layers each formed by disposing a plurality of cords at an angle of 90 degrees to the tire circumferential direction. One of the two ends of each of the cord layers was made close to the outer surface of the tire so that a distance between the cords and the outer surface of the tire was 1 mm.

The tire of the example had the structure same as that of the conventional example except the following point. A cord layer was provided between the carcass layer and the belt layers, the cord layer being formed by repeatedly winding one cord in the tire circumferential direction. Ends of the cord layer were made close to the outer surface of the tire so that a distance between the cord and the outer surface of the tire was 1 mm.

Durability tests and air leakage tests were carried out on the test tires in accordance with the following testing method. Table 1 shows results of the tests.

Durability Test

The test tires were respectively mounted on wheels each having a rim size of 15×6JJ while air pressure is set to 200 kPa, and then were respectively installed on passenger cars, each of which has an engine capacity of 1800 cc. The passengers cars were driven on a paved road for 50,000 km, and then inspections were carried out to find whether belt edge separation and sidewall cracks occurred.

Air Leakage Test

The test tires were respectively mounted on wheels each having a rim size of 15×6JJ, and then were left for three months at a room temperature of 21° C. with an initial air pressure of 250 kPa and without any load as a condition. During the period, pressures of the respective tires were measured at predetermined measurement intervals, and the inner pressures of the tires were measured every three hours. A value α was obtained by use of the following Equation (1) denoting Pt as a pressure measured, P0 as the initial pressure, and t as the number of days having passed.

$$Pt/P0 = \exp(-\alpha t) \quad (1)$$

Thereafter, a value β was obtained by use of the following Equation (2), by using a value α obtained by Equation (1) and assigning 30 (days) to t.

$$\beta = \{1 - \exp(-\alpha t)\} \times 100 \quad (2)$$

The value β represented a rate of decrease in pressure per month (%/month)

TABLE 1

|  |  | Conventional Example | Comparative Example | Example |
|---|---|---|---|---|
| Code Orientation of Code Layer | | — | Tire Width Direction | Tire Circumferential Direction |
| Results of Durability Test | Belt Edge Separation | Yes | No | No |
|  | Sidewall Crack | No | Yes | No |
| Result of Air Leakage Test (%/month) | | 2.92 | 2.94 | 2.90 |

As shown in Table 1, no belt edge separation and no sidewall crack occurred in the tire of the example after the durability test, and the tire of the example also had an excellent result of the air leakage test. In the tire of the conventional example, on the other hand, the belt edge separation occurred. Furthermore, in the tire of the comparative example, although occurrence of the belt edge separation was avoided, sidewall cracks occurred, instead.

What is claimed is:

1. A pneumatic tire in which a carcass layer is laid between a pair of bead portions so that the carcass layer links the bead portions, in which an air penetration preventing layer is disposed on the inner surface of the tire along the carcass layer, and in which belt layers are buried in a tread portion at the side of the outer periphery of the carcass layer,
    wherein a cord layer, which is formed by repeatedly winding a cord in the tire circumferential direction, is disposed between the carcass layer and the belt layers,
    at least one portion of the cord layer is made close to the outer surface of the tire so that a distance between the cord and the outer surface of the tire is not longer than 2 mm, and
    wherein a width, in which the cord layer and the belt layers overlap each other in the axial direction of the tire, is at least 10 mm.

2. The pneumatic tire according to claim 1, wherein at least the portion of the cord layer is made close to the outer surface of the tire in at least half of the entire periphery of the tire in order that the distance between the cord and the outer surface of the tire can be not longer than 2 mm.

* * * * *